United States Patent
Perrone

(10) Patent No.: US 7,743,062 B2
(45) Date of Patent: Jun. 22, 2010

(54) APPARATUS FOR SELECTING DOCUMENTS IN RESPONSE TO A PLURALITY OF INQUIRIES BY A PLURALITY OF CLIENTS BY ESTIMATING THE RELEVANCE OF DOCUMENTS

(75) Inventor: Michael P. Perrone, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 11/948,809

(22) Filed: Nov. 30, 2007

(65) Prior Publication Data

US 2008/0071778 A1 Mar. 20, 2008

Related U.S. Application Data

(63) Continuation of application No. 10/818,412, filed on Apr. 5, 2004, now abandoned.

(51) Int. Cl.
*G06F 17/30* (2006.01)

(52) U.S. Cl. ..................................................... 707/748

(58) Field of Classification Search ...................... 707/2, 707/3, 748
See application file for complete search history.

(56) References Cited

U.S. PATENT DOCUMENTS

2005/0228778 A1* 10/2005 Perrone ........................ 707/3

* cited by examiner

*Primary Examiner*—Etienne P LeRoux
(74) *Attorney, Agent, or Firm*—Scully, Scott, Murphy & Presser, P.C.; Daniel P. Morris, Esq.

(57) ABSTRACT

A system and method implemented by a computer for performing query based electronic document retrieval implementing a Markov process model adapted for determining a relationship or relevance between documents. The system ranks documents for retrieval based on their relevance measure. The model calculates the measure of relevance that a document from a given database is relevant to a given query. The method learns the Markov models mixture coefficients from the document database so as to maximize the relevance measure of the documents being retrieved. The method requires only that a similarity measure, D(d,d'), between two documents be specified. Any existing method may be used for generating a model that is at least as good as the chosen similarity measure.

1 Claim, 1 Drawing Sheet

APPARATUS FOR SELECTING DOCUMENTS IN RESPONSE TO A PLURALITY OF INQUIRIES BY A PLURALITY OF CLIENTS BY ESTIMATING THE RELEVANCE OF DOCUMENTS

BACKGROUND OF THE INVENTION

1. Field of the Invention

The present invention relates generally to document retrieval systems, generally, and particularly, query-driven systems for the automated retrieval of electronic documents.

2. Description of the Prior Art

Document retrieval systems typically comprise document databases and the ability to determine the relevance of each document to any given query, Typically queries consist of a few words, but in principal they are themselves documents. Thus the core problem of building a document retrieval system is the task of estimating the relevance of two documents when such relevance judgments are generally subjective.

Recent approaches developed to solve this task are based on the "physical" properties of the documents (i.e., on the words they contain and how frequently they appear. See, for example, the reference to Baeza-Yates, R. and Ribeiro-Neto, B. entitled "Modern Information Retrieval", Addison Wesley, 1999 and the reference to van Rijsbergen, C. J. entitled "Information Retrieval", Buttersworth, 1979).

While being a desirable approach, it would be further desirable to provide a system and method for retrieving electronic (stored) documents that does not require explicit use of semantic meaning (e.g., a thesaurus).

SUMMARY OF THE INVENTION

It is an object of the present invention to apply a discrete time Markov process for determining the relationship or relevance between electronic documents in a document search and retrieval system and method. Basically, the current invention provides a method, computer program product and system for constructing a probabilistic model for ranking documents in a database based on their probability of relevance to a given query. The method is based on a mixture model trained using various techniques.

According to one aspect of the invention, there is provided a document retrieval approach that models document-document relevance using a discrete-time, static, Markov process (see, for example, the reference to Jelinek, F. entitled "Statistical Aspects of Speech Recognition", MIT Press, 1998) in the document space. A discrete-time, static, Markov process is produced by a system that changes state at regular time steps according to fixed state-to-state transition probabilities. The states in the inventive model correspond to each document in a given database.

A Markov process over document states leads then to a sequence of documents that can link a query document with any document in a given database. Given a query, the probability of reaching a given document after "n" time steps is estimated by summing over all possible paths to the state corresponding to the document. For different tasks, databases and queries, the relevance of each time step in the Markov process will vary. The method of the invention models these variations from the data. In addition, the inventive model specifies the state-to-state transition probabilities and the initial state probabilities.

BRIEF DESCRIPTION OF THE DRAWINGS

Further features, aspects and advantages of the apparatus and methods of the present invention will become better understood with regard to the following description, appended claims, and the accompanying drawings where:

DETAILED DESCRIPTION OF THE PREFERRED EMBODIMENT

Figure 2:
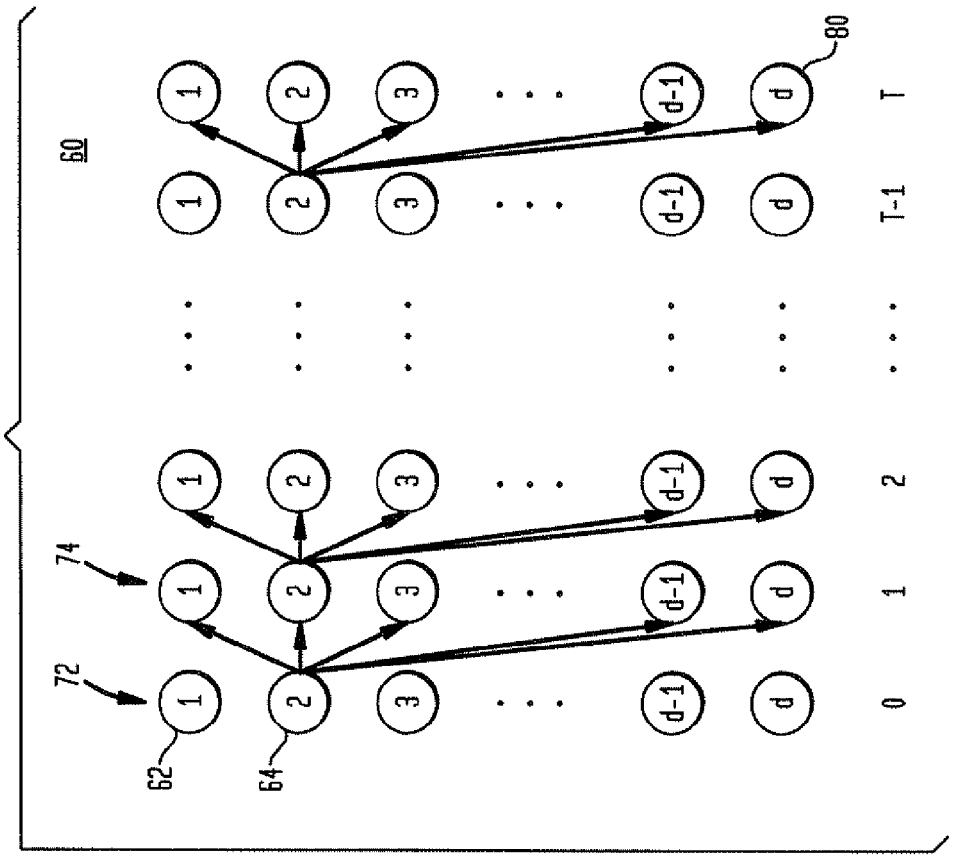

The probabilistic model for retrieving documents according to the invention, is capable of being implemented in a computer or networked computer system as described in greater detail hereinbelow with respect to FIG. 1. According to the invention, the probabilistic model is based on the Markov process represented by the trellis diagram 60 shown in FIG. 2. Such a trellis is built for each query with each node 62, 64, etc., in a column corresponding to a document, and each column 72, 74, etc., corresponding to a step in the Markov process. Thus, the node 80 at row "D" column T stores the probability that the $D^{th}$ document is relevant after T time steps. Each of the lines connecting the nodes to other nodes, in essence, represent the transition probabilities between document "i" and document "j" if the line goes from node I to node J. Thus, the diagram represents the Markov process model in that, given some initial state which has some associated probabilities, multiplying those probabilities with Markov Transition matrix elements (as will be described herein) will arrive at the next probability associated with the next state. Only a subset of the possible transitions from documents states at time t=0 to t=1 (one column to the next column in FIG. 2) is shown, however, it is understood that, according to the Markov process, the process simply requires the probability vector of the column being multiplied by the Markov transition matrix.

In order to make this model explicit, P(d|q) represents the probability that document d is relevant to query q. This may be represented by the equation (1) as follows:

$$P(d\mid q)=\sum_{t} P(d\mid t,q)P(t\mid q). \quad (1)$$

where P(d|t,q) is the probability that "d" is relevant to "q" at time step "t" and P(t|q) is the probability that the $t^{th}$ time step is relevant to "q". Assuming that the Markov property holds, there is obtained equation (2) as follows:

$$P(d\mid t,q)=\sum_{d'} T(d\mid d')P(d'\mid t-1,q). \quad (2)$$

where T(d|d') is the transition probability from state d to d'. Equation (2) defines the $t^{th}$ order semantic relevance, P(d|t,q), as a Markov process where T(d|d') is the Markov state-to-state transition matrix. Equation (1) asserts that the true relevance probability can be modeled as a weighted mixture of the order semantics. Solving for the system of equations represented by Equation (2) gives:

$$P(d \mid t, q) = \sum_{d'} P(d \mid d', t) P(d' \mid t = 0, q). \tag{3}$$

where P(d|t=0,q) is the initial state of document relevance and P(d|d',t) is the Markov transition matrix P(d|d') raised to the "t" power. For example, $$P(d \mid d', 2) = \sum_{d''} T(d \mid d'') T(d'' \mid d'). \tag{4}$$

Combining Equations (1) and (3) gives the general form of the Markov model:

$$P(d \mid q) = \sum_{t,d'} P(d \mid d', t) P(t \mid q) P(d' \mid t = 0, q). \tag{5}$$

Without loss of generality, equation (6) defines T(d|d'), i.e., the transition probability from state d to d':

$$T(d \mid d') = \frac{e^{-\beta D(d,d')}}{\sum_{d'} e^{-\beta D(d,d')}} \tag{6}$$

where β is a tuning parameter and D(q|d) is a function measuring the relevance match between d and d' and comprises a value between 0 and 1 (i.e., an exponentiation of a negative number having a value ranging between 0 and infinity). The denominator term is simply the sum to give it a probability. It is assumed that the distance measure D(q,d) does not correspond exactly to human relevance ranking; otherwise, it would not be necessary to proceed further. Instead, assuming that the distance measure D(q,d) is imperfect, the Markov model is used to improve upon it. Further assuming that P(d|t=0,q) obeys the same relationship. This assumption is reasonable given the interpretation that the system begins with all of its probability localized on state q; thus P(d|t=0, q)=T(d|q) is the state of the system after the first time step.

Thus, the problem of estimating P(d|q) is transformed into the sub-problems of estimating D(q,d) and P(t|q) herein referred to as a mixture coefficient representing the probability that the $t^{th}$ time step is relevant to a query document q. That is, the purpose of the mixture coefficient is to find the correct mixture of Markov probability time steps.

The system runs by initializing the first column of the trellis with the probabilities $p_0$(d|q), using T(d|d') to fill subsequent columns and using P(t|q) to combine the column probabilities into the final relevance probabilities. It is understood that, as Markov transition matrices can be very large, the system may reduce them, i.e., make them "sparse matrices", by removing all element values below a threshold (i.e., small values that have little or no impact on retrieval accuracy). This enables a host of sparse matrix algorithms, known to those skilled in the art, to be used to accelerate the run-time of the algorithm thus, making the system more useful. Then, a Latent Semantic Analysis (LSA) or Indexing (LSI) measure may be used to obtain the value D(q,d); however, it is understood that any suitable measure can be used. All that is left is to specify P(t|q), the mixture coefficient.

Preferably, a Maximum Likelihood (ML) or Minimum Square Error (MSE) estimates may be implemented, however, it is understood that other cost minimization methods may be used as would be known to skilled artisans familiar with machine learning. It is additionally understood that these methods may result in non-probabilistic measures of relevance, and hence, the methods may generate what is alternately referred to herein as a relevance measure(s). The step of estimating the mixture coefficients P(t|q) is now described, Use may be first made of a simplifying assumption that P(t|q) =P(t), i.e. "t" is independent of "q". This assumption makes the learning algorithms more tractable at the expense of weakening the model. However, using methods known to those skilled artisans, the mixture coefficients may be estimated without the simplifying assumption.

The ML estimate is given by equation (7) as follows:

$$P(t) = \arg \max_{P(t)} \prod_q \sum_d P(d \mid q) R(d \mid q) \tag{7}$$

where R(d|q) is a binary, hand-labeled relevance judgment. If document d is relevant to query q then R(d|q)=1 otherwise R(d|q)\equiv 0. Note that the ML estimate attempts to maximize $$\sum_d R(d \mid q) P(d \mid q) \tag{8}$$

which is the total probability of the documents relevant to q. Using the EM algorithm (with the constraint that $\Sigma_t P(t)=1$) gives the following update rule:

$$P_{\tau+1}(t) = \frac{1}{Q} \sum_{q=1}^{Q} \frac{\sum_{d,d'} P(d \mid d', t) P(d' \mid t = 0, q) R(d \mid q) P\tau(t)}{\sum_{t,d,d'} P(d \mid d', t) P(d' \mid t = 0, q) R(d \mid q) P\tau(t)} \tag{9}$$

A MSE estimate of P(t) is obtained by solving equation (10) as follows:

$$\frac{\partial}{\partial P(t)} \left\{ \sum_{dq} [p(d \mid q) - R(d \mid q)]^2 - 2\lambda \left[ \sum_t P(t) - 1 \right] \right\} = 0 \tag{10}$$

where λ is a Lagrange multiplier. The above equation leads to equation (11) as follows:

$$\sum_t P(t) \sum_{dq} (d \mid tq) P(d \mid kq) - \sum_{dq} R(d \mid q) P(d \mid kq) = \lambda. \tag{11}$$

Next, a matrix "B" is defined such that $B_{lk} = \Sigma_{dq} p_l(d|q) p_k(d|q)$, a vector "A" is defined such that $A_k = R(d|q) p_k(d|q)$, a vector "P" is defined such that $P_t = P(t)$, and, a vector "e" is defined such that $e_i \equiv 1$. Thus, equation (11) may be rewritten as:

$$BP - A + \lambda e = 0. \qquad (12)$$

Solving for P utilizing the fact that $e^T P = 1$ results in equation (13) as follows:

$$P = B^{-1}A - \frac{e^T B^1 A - 1}{e^T B^{-1} e} B^{-1} e. \qquad (13)$$

For both of these algorithm, it is necessary to truncate P(t) at some value of "t" by forcing P(t)=0 for all "t" above some time step. The threshold may be set to ten (IO) iterations, for example, in several experiments as little or no relevance measure was found to exist above that point when experiments were run with larger truncation times.

Preferably, the system and method of the invention includes a step of learning the Markov models mixture coefficients from a document database so as to maximize the relevance measure of the relevant documents being retrieved. As described herein, however, the method requires only that a similarity measure, D(d, d'), between two documents be specified. It is understood that, the ML and MSE methods described herein embodies examples of training the system parameters. Furthermore, the system may be designed to adapt, in real-time, to changes in the document database. For example, as documents are removed or added to the database, the algorithms may be iterated, or additional algorithms may be used to enable the system parameters to adapt to the changes in the document database in real-time.

It is further understood that, before performing document retrieval, all documents may or may not be subject to one or more of the following text preprocessing methods including, but not limited to: punctuation removal, stopping, stemming and vectorization steps. Each step discards some information assumed to be nearly irrelevant for retrieval purposes. The goal of the preprocessing is to remove content from the documents that can be considered "noise" and thereby improve retrieval performance. "Punctuation removal" is self-explanatory. "Stopping" involves creating a list of "stop" words all occurrences of each of which are removed from each of the documents. The stop list eliminated words that were viewed as playing no semantic role (see, for instance, the reference to Frakes, W. B. and Baeza-Yates, R., entitled Information Retrieval, Data Structures and Algorithms, Prentice Hall, 1992). Words removed include, but are not limited to: articles, prepositions, verbs of common use (e.g. "to be", "to have", etc) and other functional words. While it is not necessary, topic-dependent stop lists may be used. "Stemming" comprises the step of replacing all morphological variations of a single word (e.g. "interest", "interests", "interesting", "interested", etc.) with a single term carrying the same semantic information. "Vectorization" takes the resulting documents and converts them into vectors each element of which corresponded to a specific term appearing in a given document. It is understood that other pre-processing methods exist that could be implemented with the invention.

All the resulting vectors are organized to form the columns of the term-by-document matrix, "M". The element $M_{ij}$ accounts for the role played by term "i" in modeling the content of document "j" and can be written according to equation (14) as follows:

$$M_{ij} = G(i)L(i,j) \qquad (14)$$

where G(i) is called global weight and L(i,j) is called the local weight. The local weight is the number of times a certain term appears in the document.

The global weight emphasizes the terms that allow a better discrimination between documents. While the literature presents several weighting schemes (see, for instance, the reference to Dumais, S. entitled "Improving the Retrieval of Information from External Sources", Behavior Research Methods, Instruments and Computers, Vol. 23, pp. 229-236 (1991)), the following weighting schemes may be used including: term frequency (tf), inverse data frequency (idf), and entropy weighting (ent).

When term frequency is used, G(i) is equal to 1 and the element $a_{ij}$ corresponds to the number of times the term appears in the document. This is based on the hypothesis that, when a term appears many times it is more representative of the document content. One problem with using term frequency is that a term that appears in many documents, and thus does not provide much discrimination ability, can be weighted more than other terms that appear less times, but being in less documents, are more discriminative. This is especially a problem if no stop list is used.

The inverse data frequency approach attempts to avoid this problem by using a global weight defined according to equation (15) as:

$$G(i) = 1 + \log_2 N - \log_2 df(i) \qquad (15)$$

where "N" is the total number of documents in the database and df(i) is the number of documents including the term "i". With this weighting, the terms that appear in few documents are enhanced with respect to other terms. This is desirable because terms that appear in few documents are a good basis for discrimination. The problem of this weighting scheme is that a term appearing only once in a document can be significantly emphasized even if it is not really representative of the document content.

To overcome the problem of over-emphasis in inverse data frequency weighting, one can use entropy weighting where the global weight is defined according to equation (16) to be:

$$G(i) = 1 - \frac{\sum_j p(i,j) \log p(i,j)}{\log(N)} \qquad (16)$$

where p(i,j) is the probability of finding term "i" in a document "j" and the log(N) term corresponds to the entropy of the least discriminative distribution possible (i.e., a uniform p(i, j)). This weighting scheme gives more emphasis to the terms appearing many times in few documents. The second term in equation (16) is the relative entropy of the distribution of a term across the documents (i.e., entropy weighting). The relative entropy reaches its maximum (corresponding to 1) when a term is uniformly distributed across the documents. In this case the weight of the term is zero. On the contrary, the relative entropy is close to zero (and the corresponding weight is close to 1) when the term appears in few documents with a high frequency.

Figure 1:
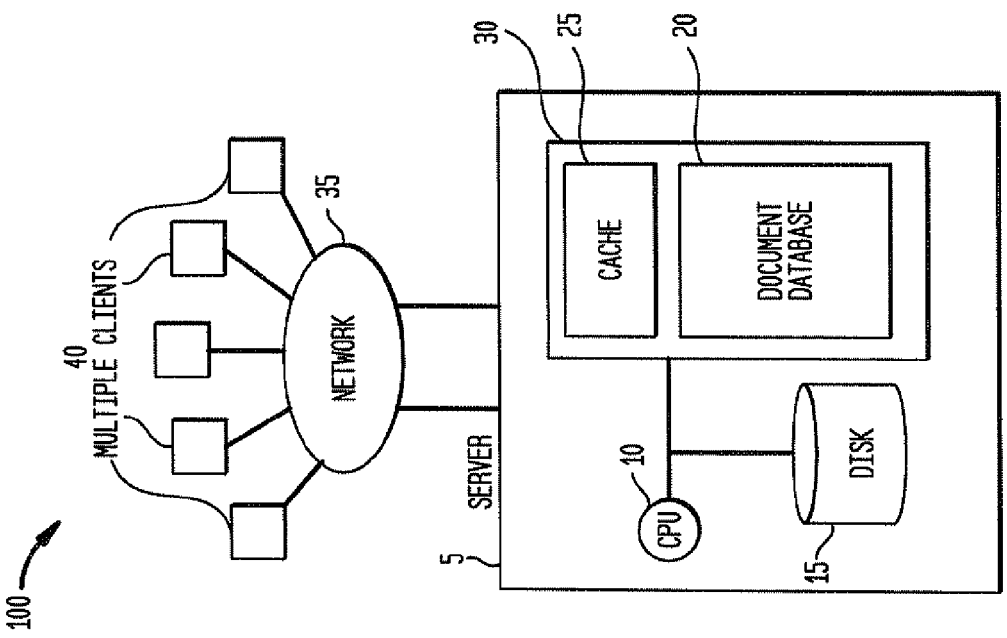
FIG. 1 is a general block diagram depicting the underlying system architecture 100 for employing the document retrieval technique implementing a discrete time, static Markov process in the document space according to the present invention; and, FIG. 2 is a trellis diagram that is built for each query according to the principles of the invention.

FIG. 1 is a general block diagram depicting the underlying system architecture 100 for employing document retrieval technique of present invention. In its most general form, the architecture may comprise a client-server system in which multiple users (clients) 40 may search a database 20 of electronic documents. The clients make these specifications (i.e., queries) across a network 35, such as the Internet or like public or private network, to a server device 5, employing software for executing the technique of the invention. For example, the server device 5 may be a Web-server such as employed by Yahoo® or Google™ for performing searches for clients over the Internet and may include a Central Processing Unit (CPU) 10, and, disk 15 and main memory 30 systems where the data method is executed. The CPU is the component in which most of the calculations are performed. The documents to be searched via the techniques of the invention may additionally be stored on a medium such as a hard drive disk 15 or other high density, magnetic or optical media storage device. In addition, a main memory 30 is available in order to perform the calculations in the CPU. Optionally, a cache 25 may be retained in order to speed up all the calculations for this system. After processing the documents employing the technique of the invention including the generation of a trellis for each query, the document search results are returned across the network to the one or more client(s) 40. It should be understood to skilled artisans that this is not the only system architecture which may support such a system, though it is the most general one. Another possible architecture could include a desktop personal computer system with a keyboard, screen and user interface which may be more suitable in a single client environment.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

The invention claimed is:

1. An apparatus for selecting documents in response to a plurality of inquiries by a plurality of clients by estimating the relevance of documents when judgments of such relevance are generally subjective comprising:
   a server;
   said server comprising an input permitting a plurality of clients to search said server for electronic documents stored therein and said input adapted to receive inquiries from said plurality of clients;
   a network for coupling said plurality of clients to said server through said input;
   said server comprises a central processing unit and a memory;
   said memory comprises a document database;
   said document database stores a plurality of documents;
   said relevance of each of said plurality of documents is estimated by a probabilistic model, based on a Markov process, for ranking each of said plurality of documents in said document database based on each of said plurality of documents probability of relevance to each of said plurality of inquiries;
   said Markov process comprises a plurality of time steps;
   said relevance of each of said plurality of documents to each of said plurality of inquiries is determined by said central processing unit which builds a trellis diagram for each of said plurality of inquiries;
   said trellis diagram corresponding to a two dimensional array of nodes, one dimension of said array corresponds to a plurality of columns of said array and a second dimension of said array corresponds to a plurality rows of said array;
   each row of said plurality of rows corresponds to one of said plurality of documents;
   each column of said plurality of columns corresponds one of said steps of said Markov process,
   each column of said plurality of columns comprises a plurality of elements there being an element of said plurality of elements corresponding to each of said plurality of documents;
   a transition matrix stored in said memory comprising a plurality of elements;
   said transition matrix comprising a number of rows and a number of columns;
   said number of rows and said number of columns being equal to the number of said plurality of documents;
   said plurality of elements of said transition matrix comprise a measure of the relevance of each document of said plurality of documents to each of the other of said plurality of documents;
   said central processing unit using said transition matrix to generate said trellis diagram;
   said central processing unit in response to one of said plurality of inquiries determining a time zero probability vector;
   said time zero probability vector comprising a number of vector elements, said number of vector elements is equal to said number of said plurality of documents;
   said number of vector elements of said time zero probability vector is a time zero determination of the relevance of said one of said plurality of inquiries to each of said plurality of documents;
   said time zero determination of said relevance of said one of said plurality of inquiries to each of said plurality of documents is improved upon by said probabilistic model by matrix multiplying said time zero probability vector by said transition matrix to determine a time one probability vector;
   said time one probability vector comprises a number of vector elements, said number of vector elements of said time one probability vector is equal to said number of said plurality of documents;
   said number of vector elements of said time one probability vector is a time one determination of the relevance of said one of said plurality of inquiries to each of said plurality of documents;
   said matrix multiplying of a probability vector corresponding to a particular time by said transition matrix to determine a probability vector for the next time unit after said particular time is repeated a sufficient number of times to generate said trellis diagram which is a matrix formed by a plurality of time ordered probability vectors, said sufficient number of said times is selected from the group consisting of: a specified number of times, and a number of times determined from an analysis of sample queries of sample documents, wherein said analysis of said sample queries of said sample documents identifies an optimal value of the number of said time ordered probability vectors needed to identify the most relevant document in said sample documents; and,
   an analysis of the relevance of said plurality of documents corresponding to said particular inquiry is determinable from said two dimensional array of nodes of said trellis diagram.

* * * * *